(12) United States Patent
Boustead et al.

(10) Patent No.: US 8,543,727 B2
(45) Date of Patent: Sep. 24, 2013

(54) DEVICES AND METHODS FOR ROUTING A UNIT OF DATA IN A NETWORK

(75) Inventors: Paul Andrew Boustead, Figtree (AU); Farzad Safaei, Mt. Keira (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 1488 days.

(21) Appl. No.: 11/581,794

(22) Filed: Oct. 16, 2006

(65) Prior Publication Data

US 2007/0133503 A1 Jun. 14, 2007

Related U.S. Application Data

(63) Continuation of application No. PCT/AU2005/000535, filed on Apr. 15, 2005.

(30) Foreign Application Priority Data

Apr. 16, 2004 (AU) ................................ 2004902023

(51) Int. Cl.
    *G06F 15/173* (2006.01)
(52) U.S. Cl.
    USPC ........................... 709/238; 709/220; 370/238
(58) Field of Classification Search
    USPC .................................. 709/221, 220; 370/238
    See application file for complete search history.

(56) References Cited

U.S. PATENT DOCUMENTS

| | | | |
|---|---|---|---|
| 6,205,488 B1 | 3/2001 | Casey et al. | |
| 6,950,394 B1 * | 9/2005 | Chou et al. | 370/229 |
| 6,985,454 B1 * | 1/2006 | Wiedeman et al. | 370/316 |
| 7,123,587 B1 * | 10/2006 | Hass et al. | 370/238 |
| 2002/0126681 A1 | 9/2002 | Kazban | |
| 2003/0043762 A1 * | 3/2003 | Pang et al. | 370/328 |
| 2003/0065815 A1 | 4/2003 | Klink | |
| 2003/0174706 A1 | 9/2003 | Shankar et al. | |
| 2004/0071080 A1 | 4/2004 | Uchiyama et al. | |

FOREIGN PATENT DOCUMENTS

| | | |
|---|---|---|
| EP | 1 187405 A1 | 3/2002 |
| JP | 2002-354022 | 12/2002 |
| WO | WO 02/19624 A2 | 3/2002 |
| WO | WO 02/28035 A1 | 4/2002 |
| WO | WO 03/013075 | 2/2003 |
| WO | WO 03/013075 A1 | 2/2003 |
| WO | WO 03/085900 | 10/2003 |
| WO | WO 03/085900 A1 | 10/2003 |
| WO | WO 03/092226 | 11/2003 |
| WO | WO 03/092226 A1 | 11/2003 |

OTHER PUBLICATIONS

International Search Report for PCT/AU2005/000535, dated Jun. 22, 2005.
International Preliminary Report on Patentability for PCT/AU2005/000535, dated Jun. 6, 2006.

* cited by examiner

*Primary Examiner* — Tammy Nguyen
(74) *Attorney, Agent, or Firm* — Hickman Palermo Truong Becker Bingham Wong LLP; Kirk D. Wong

(57) ABSTRACT

A device for routing a unit of data in a network, the device comprising a processing means that is operable to: determine an identity of a first path in the network that was used to transfer the unit of data; identify a second path in the network based on the identity of the first path; and forward the unit of data over the second path to thereby route the unit of data in the network.

13 Claims, 6 Drawing Sheets

DEVICES AND METHODS FOR ROUTING A UNIT OF DATA IN A NETWORK

CROSS-REFERENCE TO RELATED APPLICATIONS

This application is a continuation of PCT Patent Application No. PCT/AU2005/000535 filed on Apr. 15, 2005 which claims priority of Australian Patent Application No. 2004902023 filed on Apr. 16, 2004, the disclosures of which are incorporated herein in their entirety by reference.

FIELD OF THE INVENTION

The present invention relates generally to devices and methods for routing a unit of data in a network. More specifically, the present invention has particular—but by no means exclusive—application to routing packets in a shared network environment for latency driven distributed applications.

BACKGROUND OF THE INVENTION

There is an emerging class of computer applications that require the use of a network of geographically dispersed servers in order to improve the performance of the applications by reducing network delay. Applications of this nature are sometimes referred to as Latency Driven Distributed (LDD) applications. An example of an LDD application is a massively multi-player real-time game that operates over the Internet. Applications of this nature typically involve the real-time composition of multimedia material from distributed sources around the Internet. Consequently, to preserve the real-time nature of LDD applications it is often necessary to perform processing and distribution of data on servers that are located near users of the LDD applications. For example, performing processing and distribution of multimedia data on a server located in Europe for users located in Australia may introduce a delay that significantly degrades the real-time performance of the LDD applications for Australian users. In this example it would be advantageous to reduce the delay by performing the processing and distribution of the multimedia data from a server located in Australia.

While it is possible for LDD application providers to purchase and install their own infrastructure to provide themselves with a set of geographically dispersed servers, this option has the disadvantage of being relatively costly. A more cost-effective solution is to lease or hire the necessary computing resources from a party that owns the servers and provide the paths etc. Unfortunately, the disadvantage with this option is that application providers will probably share the physical resources (that is, computing resources) with other application providers, which may lead to a degradation in the perform of LDD applications due to processing delays.

DEFINITIONS

The following provides definitions for various terms used throughout this specification.

Routing—used to refer to the action of forwarding a unit of data in a communication network. The term "routing" as used in this specification is not restricted to a particular technique for forward a unit of data. Consequently, the word "routing" is broad enough to cover a range of techniques including, for example, level 3 network level packet routing or level 2 link level switching.

Path—used to refer one or more links in a communication network that are used to transfer a unit of data between network nodes. Consequently, a path can include a single link that allows adjacent nodes to exchange data, or a series of links that enable the data to be exchanged between non-adjacent nodes via other nodes. Furthermore, the terms "path" and "link" as used throughout this specification are indented to cover physical paths or links, such as a fibre optic cable, or virtual paths or links such as an IP tunnel.

SUMMARY OF THE INVENTION

According to a first aspect of the present invention there is provided a device for routing a unit of data in a network, the device comprising a processing means that is operable to:
determine an identity of a first path in the network that was used to transfer the unit of data;
identify a second path in the network based on the identity of the first path; and
forward the unit of data over the second path to thereby route the unit of data in the network.

Preferably, the processing means is operable to identify the second path by:
selecting a routing record from one or more first routing records;
determining whether the routing record contains a reference to one or more second routing records;
identifying the second path by examining the routing record upon determining that the routing record does not contain the reference; and
upon determining that the routing record contains the reference: selecting another routing record from the second routing records; and identifying the second path by examining the other routing record.

Preferably, the processing means is operable such that when selecting the routing record from the first routing records the processing means identifies one of the first routing records that comprises information that corresponds to the identity of the first path to thereby select the routing record.

Preferably, the processing means is operable such that when selecting the other routing record from the second routing records the processing means identifies one of the second routing records that comprises the information that corresponds to the identity of the first path, and additional information that corresponds to application information contained in the unit of data to thereby select the other routing record.

Preferably, the application information contained in the unit of data comprises an identification of a computing device from which the unit of data originated.

Preferably, the processing means is operable to determine the identity of the first path by examining the unit of data.

Preferably, the processing means is operable such that when forwarding the unit of data over the second path it arranges the unit of data such that it identifies the second path.

Preferably, the first path comprises a tunnel in the network.

Preferably, the second path is one of a plurality of second paths in the network, wherein the second paths comprises another tunnel in the network and a non-tunnel path in the network.

Preferably, the network is based on packet switching.

Preferably, the unit of data is an IP packet.

According to a second aspect of the present invention, there is provided a method of routing a unit of data in a network, the method comprising the steps of:
determining an identity of a first path in the network that was used to transfer the unit of data;
identifying a second path based on the identity of the first path; and forwarding the unit of data over the second path to thereby route the unit of data.

Preferably, the step of identifying the second path comprises the steps of:

selecting a routing record from one or more first routing records;

determining whether the routing record contains a reference to one or more second routing records;

identifying the second path by examining the routing record upon determining that the routing record does not contain the reference; and upon determining that the routing record contains the reference: selecting another routing record from the second routing records; and identifying the second path by examining the other routing record.

Preferably, the step of selecting the routing record from the first routing records comprises the step of identifying one of the first routing records that comprises information that corresponds to the identity of the first path to thereby select the routing record.

Preferably, the step of selecting the other routing record from the second routing records comprises the step of identifying one of the second routing records that comprises the information that corresponds to the identity of the first path, and additional information that corresponds to application information contained in the unit of data to thereby select the other routing record.

Preferably, the application information contained in the unit of data comprises an identification of a computing device from which the unit of data originated.

Preferably, the step of determining the identity of the first path comprises the step of examining the unit of data.

Preferably, the step of forwarding the unit of data over the second path comprises the step of arranging the unit of data such that it identifies the second path.

Preferably, the first path comprises a tunnel in the network.

Preferably, the second path is one of a plurality of second paths in the network wherein the second paths comprises another tunnel in the network and a non-tunnel path in the network.

Preferably, the network is based on packet switching.

Preferably, the unit of data is an IP packet.

According to a third aspect of the present invention, there is provided a device for routing a unit of data in a network, the device comprising a processing means operable to:

determine a destination of the unit of data;

assign the unit of data a label based on the destination of the unit of data;

select a routing record from one or more routing records based on the label; and forward the unit of data over a path identified in the routing record.

Preferably, the processing means is operable to select the routing record by identifying one of the routing records that comprises information that corresponds to the label assigned to the unit of data, and additional information that corresponds to application information contained in the unit of data to thereby select the routing record.

Preferably, the application information contained in the unit of data comprises an identification of a computing device from which the unit of data originated.

Preferably, the processing means is operable such that when forwarding the unit of data over the path it arranges the unit of data such that it identifies the path.

Preferably, the path is one of a plurality of paths in the network wherein the paths comprises a tunnel in the network and a non-tunnel path in the network.

Preferably, the network is a packet switched network.

Preferably, the unit of data comprises an IP packet.

According to a fourth aspect of the present invention, there is provided a method of routing a unit of data in a network, the method comprising the steps of:

determining a destination of the unit of data;

assigning the unit of data a label based on the destination of the unit of data;

selecting a routing record from one or more routing records based on the label; and forwarding the unit of data over a path identified in the routing record.

Preferably, the step of selecting the routing record comprises the step of identifying one of the routing records that comprises information that corresponds to the label assigned to the unit of data, and additional information which corresponds to application information contained in the unit of data to thereby select the routing record.

Preferably, the application information contained in the unit of data comprises an identification of a computing device from which the unit of data originated.

Preferably, the step of forwarding the unit of data over the path comprises the step of arranging the unit of data such that it identifies the path.

Preferably, the path is one of a plurality of paths in the network wherein the paths comprises a tunnel in the network and a non-tunnel path in the network.

Preferably, the network is a packet switched network.

Preferably, the unit of data comprises an IP packet.

According to a fifth aspect of the present invention, there is provided a computer program comprising at least one instruction for causing a computing device to carry out the method according to the second and/or fourth aspect of the present invention.

According to a sixth aspect of the present invention, there is provided a computer readable medium comprising the computer program according to the fifth aspect of the present invention.

BRIEF DESCRIPTION OF THE DRAWINGS

Notwithstanding any other embodiments that may fall within the scope of the present invention, an embodiment of the present invention will now be described, by way of example only, with reference to the accompanying figures, in which.

AN EMBODIMENT OF THE INVENTION

Figure 1:
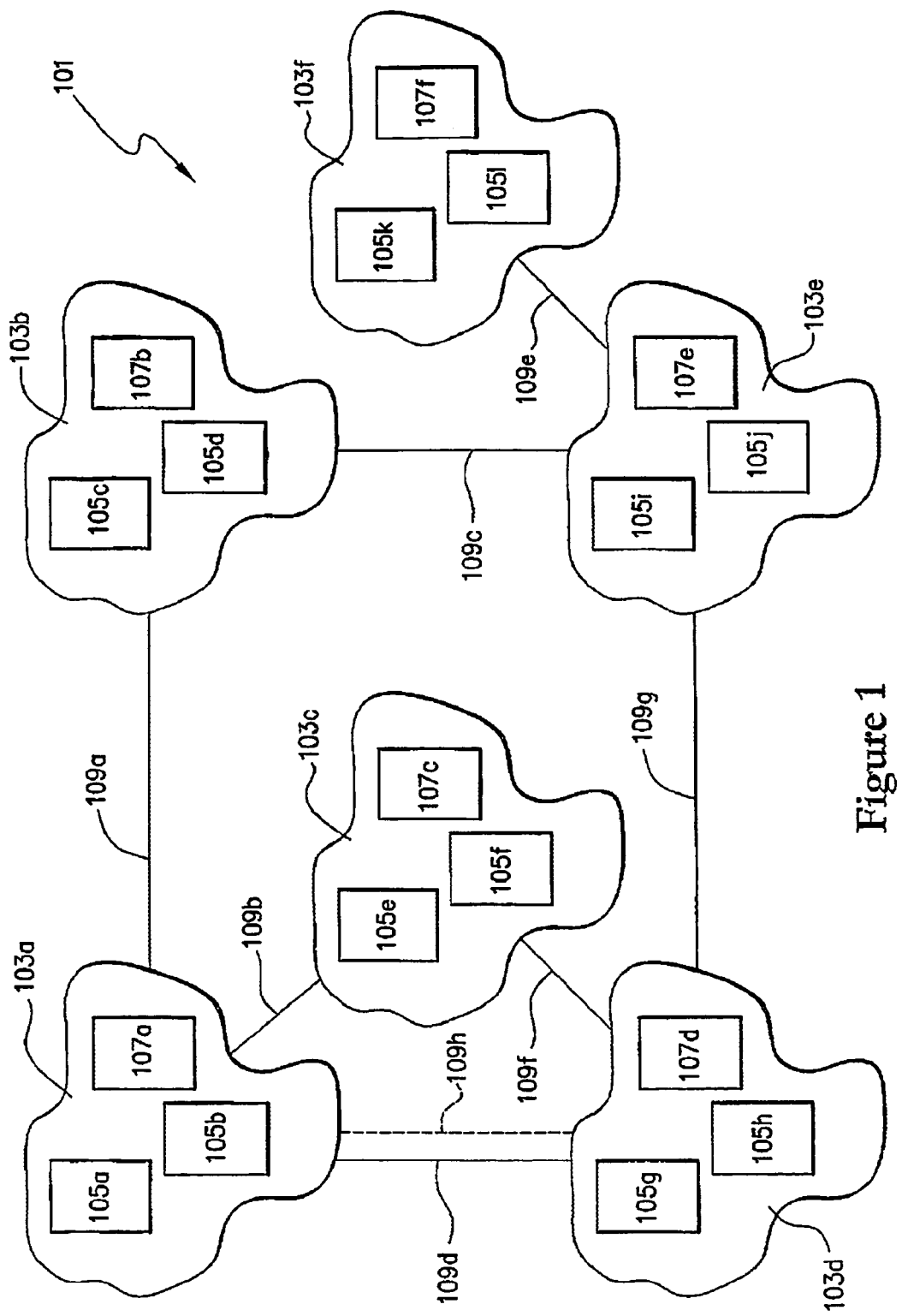
FIG. 1 provides a schematic diagram of a network according to the embodiment of the present invention.

FIG. 1 depicts a shared computer network 101 that can be used to run Latency Driven Distributed (LDD) applications. The network 101 comprises a plurality of geographically dispersed sub-networks 103. For example, the sub-networks 103 may be located in different countries and maintained by different organisations. The sub-networks 103 are sometimes referred to as intranets. Each sub-networks 103 comprises one or more computer servers 105 and a device 107 that is operable to route data packets between the sub-networks 103. Each device 107, which is commonly referred to as a gateway, router or switch is in the form of an electronic device dedicated to routing data packets. To exchange a data packet with each other the computer servers 105 and the device 107 in each sub-network 103 are networked together using, for example, high speed Ethernet. To enable data packets to be routed between the sub-networks 103 the network 101 also comprises a plurality of links 109 that can be established to connect adjacent devices 107 the devices 107 to route (exchange) data amongst each other. The links 109 can be in the form of 'best effort' (no service level agreement) or tunnels or VPN's that provide a required level of service.

Before deploying an LDD application in the network 101 the LDD application provider approaches the operators of a number of the sub-networks 103 to hire some of the capacity of the computer servers 105 and switching resources in the devices 107. Typically, the application provider will only approach those operators who control a sub-network 103 in a geographic location that the application provider wishes to have application processing capacity. The computer servers 105 are such that the operator of the respective sub-networks 103 can configure the hired capacity as virtual servers for exclusively running the application provider's LDD applications. The application provider then establishes the links 109 that interconnect the devices 107 in the sub-networks 103 that the application provider has virtual servers. For instance, if the application provider has virtual servers in sub-networks 103*a* 103*c* and 103*d* the application provider may hire bandwidth assured links 109*b* and 109*d* from network providers.

Alternatively, the application provider may choose to hire bandwidth assured links 109*b* and 109*d* and establish a best effort link 9*h* between sub-networks 103*a* and 103*d*. The link 109*c* will be used where delay in routing a packet does not matter. The application provider or network service provider establishes the necessary links 109 so that data packets can be transferred to the appropriate virtual servers for processing by the LDD application running thereon.

Figure 2:
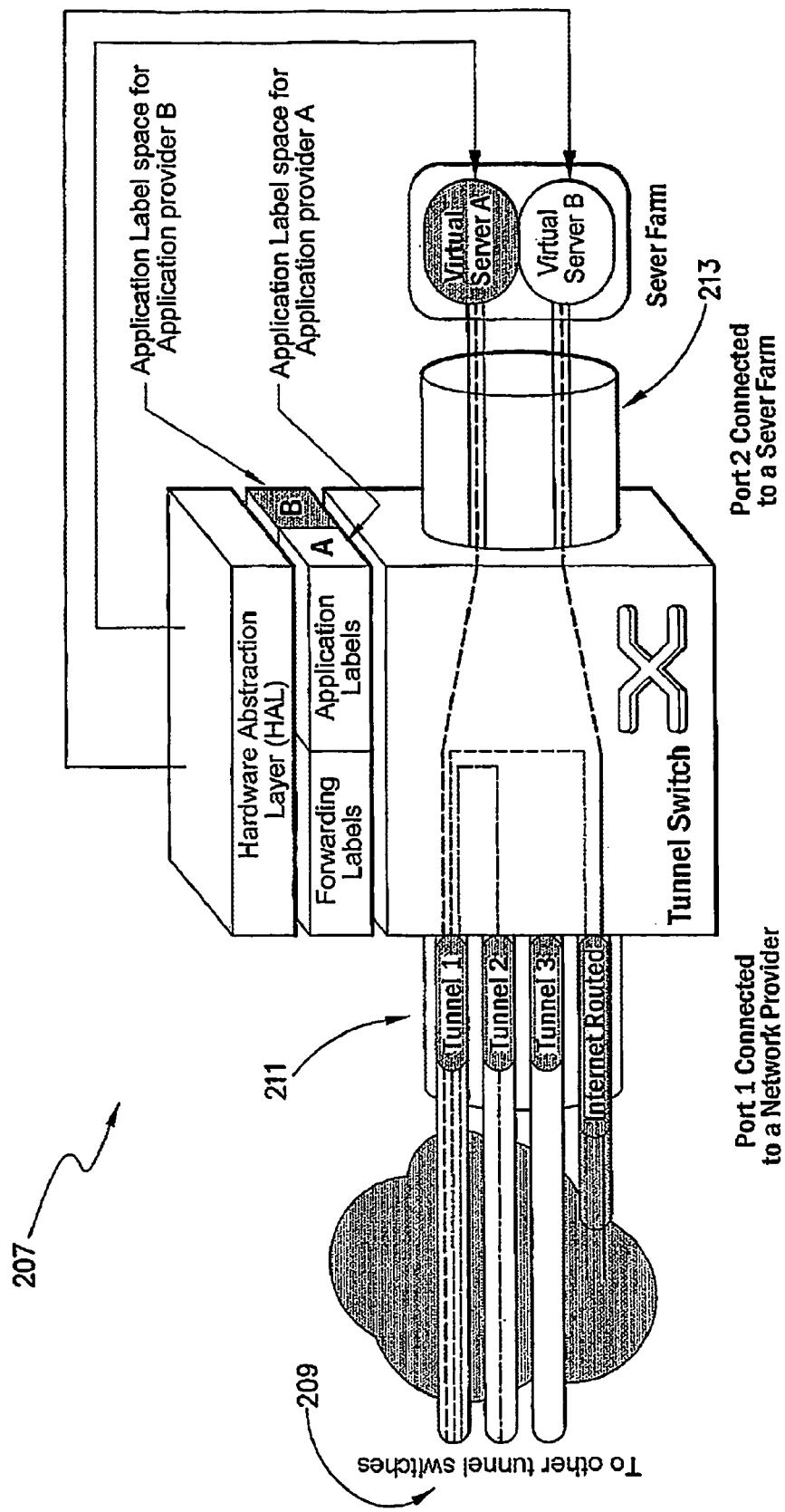
FIG. 2 provides a representation of a device for routing units of data in the network of FIG. 1.

As mentioned previously, the network 101 comprises the device 107, which performs routing of data packets. More specifically, the devices 107 are arranged to perform the task of routing the data packets for delivery to the appropriate virtual server running the LDD application. With reference to FIG. 2, each of the devices 207 has a first interface 211 and a second interface 213. The first interface 211 is capable of supporting a number of IP tunnels over a link 109. In the previous example where the application provider has virtual servers in sub-networks 103*a* and 103*c*, the IP tunnels would be supported by link 9*b*. In addition to supporting IP tunnels, the first interface 211 is also capable of supporting non-tunnel best effort IP connections. The second interface 213 is basically connected to the virtual servers that may be operating in the respective sub-networks 103.

Each of the devices 107 also comprises a routing process (not shown in the figures). Generally speaking, the routing process is capable of routing data packets received on the first interface 211 (that is, data packets received via the IP tunnels or non-tunnel IP connection) based on an identity of the IP tunnel over which the first interface 211 received the data packets. As is elaborated on in the following paragraphs, the routing process in each of the devices 107 determines the identity of the IP tunnel by examining a forwarding label (tunnel identifier) contained in a field of the data packets received on the first interface 211. In the present embodiment of the invention the forwarding label is in the form a destination IP address of the packets received on the first interface 211. The IP address could also identify an IP in IP tunnel. It is envisaged that in an alternative embodiment of the present invention the forwarding label could also be another identifier in the packet header or payload. In this regard, the forward label could be the "flow label" identifier in an IPv6 packet. The routing process is such that it involves selecting one of the IP tunnels or non-tunnel IP connections based on the identify of the IP tunnel over which the data packets were received, and forwarding the received data packets over the selected IP tunnels or non-tunnel IP connection. Alternatively, the routing process can involve the received data packets being forwarded onto a virtual server via the second interface 213 for processing by the LDD applications running thereon.

To increase the level of granularity in the routing process's ability to route data packets, the devices 107 can also route data packets based on application information. Thus, the device 107 effectively performs tunnel level switching (as described in the previous paragraph) and application level switching. To determine the application information the routing process in a device 107 checks an application label that is contained in received data packets. In the case of the present embodiment of the invention the application information is effectively a unique identifier of a device from which the data packet originated.

The advantage of having the devices 107 route data packets based on the forwarding labels (the identification of the IP tunnels) and the application labels (application related information) is that the application provider has the ability to control Quality of Service (QoS), implement multicast, deploy efficient session redirection and flow re-routing as well as packet filtering and similar services between the virtual servers without burdening the virtual servers with network level functions.

Figure 3:
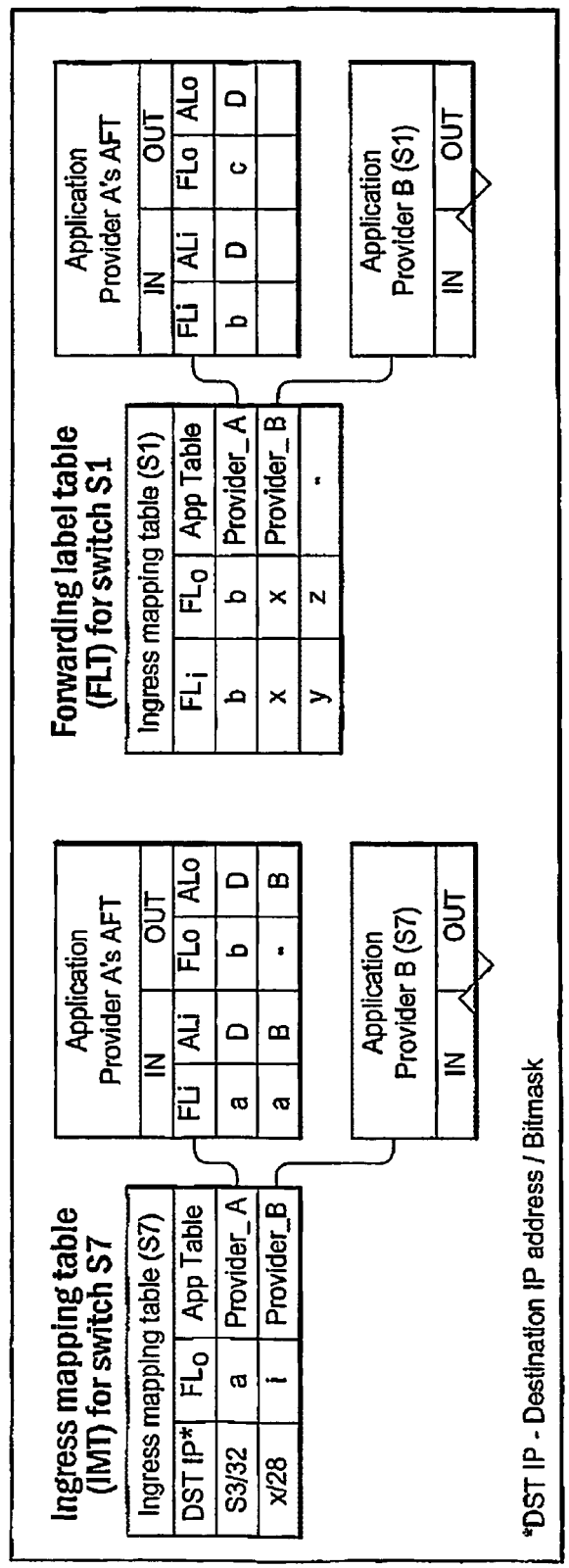
FIG. 3 shows an example of routing tables maintained by the device of FIG. 2.

In order to forward the data packets based on the forwarding labels and the applications labels, each of the devices 107 maintains a forwarding label table, an example of which is shown in FIG. 3. The forwarding label table contains an incoming forwarding label $FL_i$, an outgoing forwarding label $FL_o$ and a link to an application forwarding table. Whilst not shown in the forwarding table of FIG. 3, it is envisaged that the forwarding table could also comprises an Application Label Offset and an Application Label Mark. These two components of the forwarding table can effectively be used to locate the application label in received data packets. More specifically, the Application Label Offset represents the number of bytes from the start of a received data packet at which the application label is located. The Application Label Mask is then used to calculate the application label by applying the Application Label Mask to data which is contained at the Application Label Offset.

Each application provider has their own application forwarding table. If the link to the application forwarding table is empty then the routing process will route data packets based on information contained in the forwarding label table. If on the other hand the link to the application forwarding table is not empty then the routing process will route data packets based on information contained in the application forwarding table. An example application forwarding table is also shown in FIG. 3. The application forwarding table contains an incoming forwarding label $FL_i$, an incoming application label $AL_i$, an outgoing application label $AL_o$ and an outgoing forwarding label $FL_o$.

Data packets forwarded to virtual servers from client devices will initially arrive at one of the devices 107. These received data packet may or may not have a forwarding label.

Typically, the data packets would arrive by the normal routing process in the network 101. In order to forward data packets of this nature each of the devices 107 maintains an ingress mapping table, an example of which is shown in FIG. 3. The ingress mapping table contains a destination IP address prefix (of one of the computer servers 105 which is supporting the virtual server) in the form of an address and bit mask, a forwarding label $FL_o$ and a link to an application forwarding table. If the destination address of a data packet matches an entry in the ingress mapping table then the routing process assigns a forwarding label $FL_o$ to the data packet. The routing process then routes the data packet based on information contained in the application forwarding table which is pointed to by the "App Table" field in the ingress mapping table. If the "App Table" is empty the data packet will be routed directly to the tunnel identified by $FL_o$.

The devices 107 are arranged such that the application providers can alter the various labels contained in the tables maintained by the devices 107. It is noted that the devices 107 are such that application providers can only alter tables and labels that are associated with them and can not alter tables or use labels associated with other application providers. To enforce this aspect, each of the devices 107 comprises an application program interface (API) called the Network Abstraction Layer, which can be seen in FIG. 2. The network abstraction layer hides the actual values of the forwarding labels used by the application providers and ensures that application providers can only change label table entries that belong to them. Furthermore, as mentioned earlier each of the devices 107 maintains a separate application label table for each different application provider.

The following provides an example of how the network 101 provides a rich immersive communications environment within a massively multi-player game or a distributed virtual environment. For the purposes of this example the LDD application provides an individual three-dimensional audio scene for each player of all other players within earshot. The example describes: (1) labelling of packets with application labels at the client; (2) the use of forwarding labels to create tunnel switched paths; (3) application level control of forwarding using application labels within the network; and (4) application control over quality of service.

Figure 4:
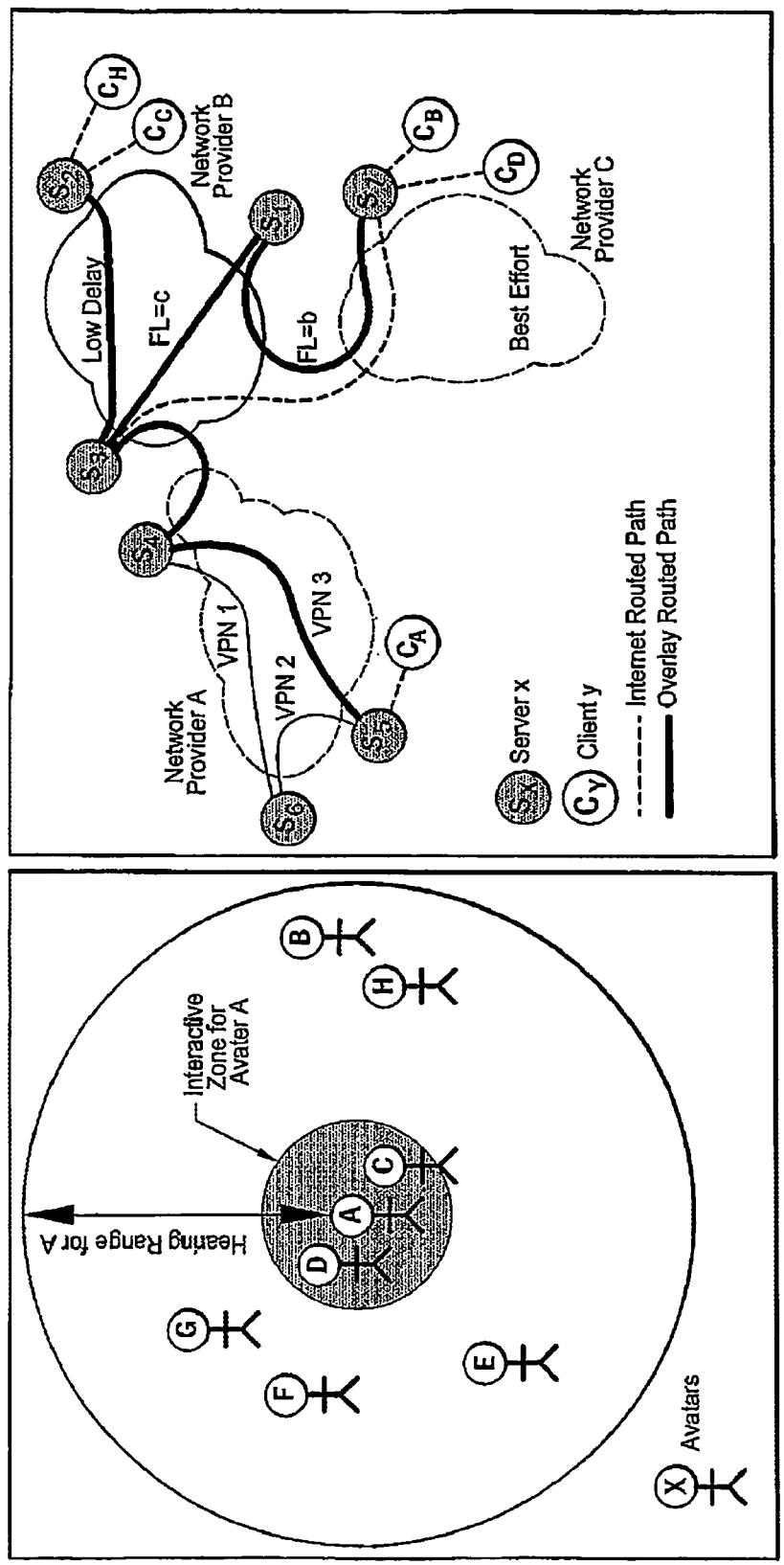
FIG. 4 provides an example of a network in accordance with another embodiment of the present invention.

It is assumed that application provider A has hired virtual servers at the sites $S^1$ to $S^7$ as shown in FIG. 4. A small subset of the clients ($C_A \ldots C_H$) of the rich immersive communication service is examined. FIG. 4(a) shows the location of these users in the virtual world and their spatial location with respect to Avatar A. Two areas are defined as the hearing range of an avatar as well as an interactive zone (where interactive communication is likely with other avatars). A low delay is required from other sources within the interactive zone and a higher delay can be tolerated from sources outside the interactive zone. The physical location of the "owners" of the avatars in relation to a subset of the hired servers is shown in FIG. 4(b). The best position to calculate the audio scene for the area of the virtual world which contains these users is calculated by the application provider (possibly as a compromise between delay and resource usage) to be in San Francisco in server $S^3$. It is assumed that servers $S^1$ and $S^7$ shown in FIG. 4(c) maintain the formal label tables and ingress mapping tables shown in FIG. 3.

For this application a unique avatar ID is assigned to each client. Client $C_A$ is assigned avatar ID A, $C_B$ is assigned avatar ID B etc. This avatar ID is useful for the application to route audio flows to the correct server and to determine the required quality of service to give to each flow. Because of its usefulness, the application provider uses this value for the application label. Thus each client sets the application label of each audio packet to their avatar ID. Other types of flows such as state information may be labelled differently.

In order to send audio packets from the client node $C_D$ through the network 101 to server $S^3$ they are encapsulated in an IP-in-IP tunnel with the address of server $S^7$ in the outside IP header and the address of $S^3$ in the inside header. When the packet arrives at $S^7$ the encapsulation is removed and the packet is forwarded based on the ingress mapping tables $S^7$. In this case, since D is within the interactive zone of A a low delay link is required. The packet is given a forwarding label of a and is then forwarded by application provider A's forwarding table. The forwarding label will be swapped from a to b and will be forwarded to $S^1$. At $S^1$ the packet will be switched from tunnel b to tunnel c on the way towards $S^3$.

Packets arriving at $S^7$ from $C_B$ will also be switched to $S^3$. However, the application decides to send the stream on a higher delay path (since avatar B is just at the edge of avatar A's hearing range). This is enabled by placing an entry for application label B in the application forwarding table in $S^7$ with an empty forwarding label out field ($FL_o$). This indicates that forwarding labels will be removed and the packets will be sent on an Internet routed path.

To keep this example simple references to multicast and other switch operations have been left out. The two level application/forwarding label switching operation is very powerful. Many operations can be performed within the overlay network based on the application label, flows may be dropped, re-routed, or multicast based upon network conditions or changes in the game requirements (a flow may not require a low delay link at this point in time).

Figure 5:
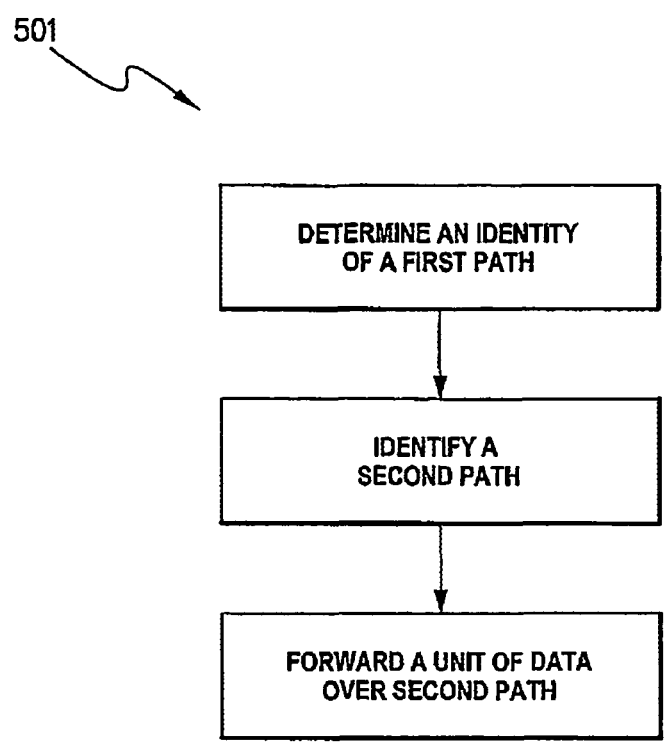
FIG. 5 provides a flow chart of various steps performed by the networks of FIGS. 1 and 4.
Figure 6:
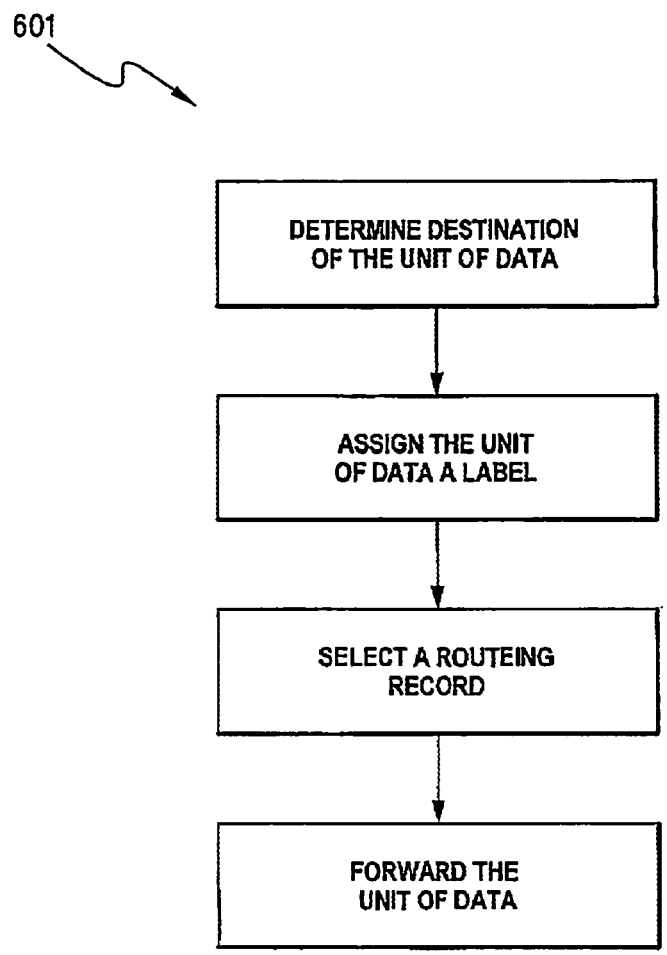
FIG. 6 provides another flow chart of various steps performed by the networks of FIGS. 1 and 4

The various steps performed by the network 104 are shown in the flow charts 501 and 601 of FIGS. 5 and 6.

Those skilled in the art will appreciate that the invention described herein is susceptible to variations and modifications other than those specifically described. It should be understood that the invention includes all such variations and modifications which fall within the spirit and scope of the invention.

We claim:

1. A device for routing a unit of data in a network, the device comprising:
a subsystem, implemented at least partially in hardware, that determines a destination of the unit of data;
a subsystem, implemented at least partially in hardware, that assigns the unit of data a label based on the destination of the unit of data;
a subsystem, implemented at least partially in hardware, that selects a routing record from one or more routing records based on the label, the one or more routing records alterable by one or more application providers, the one or more routing records comprising application provider associated information alterable by each associated application provider; and
a subsystem, implemented at least partially in hardware, that forwards the unit of data over a path identified in the routing record;
a processing means operable to select the routing record by identifying one of the routing records that comprises information that corresponds to the label assigned to the unit of data, and additional information that corresponds to originating application information, specific to a particular application provider, contained in the unit of data.

2. The device as claimed in claim 1, wherein the application information contained in the unit of data comprises an identification of a computing device from which the unit of data originated.

3. The device as claimed in claim 2, wherein the device is operable such that when forwarding the unit of data over the path it arranges the unit of data such that it identifies the path.

4. The device as claimed in claim 3, wherein the path is one of a plurality of paths in the network, wherein the paths comprises a tunnel in the network and a non-tunnel path in the network.

5. The device as claimed in claim 1, wherein the network comprises a packet switched network.

6. The device as claimed in claim 1, wherein the unit of data comprises an IP packet.

7. A method for routing a unit of data in a network, the method comprising:
   determining a destination of the unit of data;
   assigning the unit of data a label based on the destination of the unit of data;
   selecting a routing record from one or more routing records based on the label, the one or more routing records alterable by one or more application providers, the one or more routing records comprising application provider associated information alterable by each associated application provider; and
   forwarding the unit of data over a path identified in the routing record;
   wherein the selecting the routing record step further comprises identifying one of the routing records which comprises information that corresponds to the label assigned to the unit of data, and additional information that corresponds to originating application information, specific to a particular application provider, contained in the unit of data.

8. The method as claimed in claim 7, wherein the application information contained in the unit of data comprises an identification of a computing device from which the unit of data originated.

9. The method as claimed in claim 7, wherein forwarding the unit of data over the path comprises arranging the unit of data such that it identifies the path.

10. The method as claimed in claim 7, wherein the path is one of a plurality of paths in the network, wherein the paths comprise a tunnel in the network and a non-tunnel path in the network.

11. The method as claimed in claim 7, wherein the network comprises a packet switched network.

12. The method as claimed in claim 7, wherein the unit of data comprises an IP packet.

13. A non-transitory computer readable medium comprising at least one instruction for causing a computing device to carry out a method comprising:
   determining a destination of the unit of data; assigning the unit of data a label based on the destination of the unit of data;
   selecting a routing record from one or more routing records based on the label, the one or more routing records alterable by one or more application providers, the one or more routing records comprising application provider associated information alterable by each associated application provider; and
   forwarding the unit of data over a path identified in the routing record;
   wherein the selecting the routing record step further comprises identifying one of the routing records which comprises information that corresponds to the label assigned to the unit of data, and additional information that corresponds to originating application information, specific to a particular application provider, contained in the unit of data.

* * * * *